(12) United States Patent
Wang et al.

(10) Patent No.: US 11,226,513 B2
(45) Date of Patent: Jan. 18, 2022

(54) CURVED DISPLAY PANEL, MANUFACTURING METHOD THEREOF AND DISPLAY DEVICE

(71) Applicants: Ordos Yuansheng Optoelectronics Co., Ltd., Ordos (CN); BOE TECHNOLOGY GROUP CO., LTD., Beijing (CN)

(72) Inventors: Huilian Wang, Beijing (CN); Xuelu Wang, Beijing (CN); Yan Wang, Beijing (CN); Yanqing Chen, Beijing (CN)

(73) Assignees: Ordos Yuansheng Optoelectronics Co., Ltd., Ordos (CN); BOE TECHNOLOGY GROUP CO., LTD., Beijing (CN)

(*) Notice: Subject to any disclaimer, the term of this patent is extended or adjusted under 35 U.S.C. 154(b) by 40 days.

(21) Appl. No.: 16/641,939

(22) PCT Filed: Jul. 24, 2019

(86) PCT No.: PCT/CN2019/097509
§ 371 (c)(1),
(2) Date: Feb. 25, 2020

(87) PCT Pub. No.: WO2020/057250
PCT Pub. Date: Mar. 26, 2020

(65) Prior Publication Data
US 2021/0149242 A1 May 20, 2021

(30) Foreign Application Priority Data
Sep. 19, 2018 (CN) .................. 201811092294.X (51) Int. Cl.
G02F 1/1335 (2006.01)
G02F 1/1339 (2006.01)

(52) U.S. Cl.
CPC ...... *G02F 1/133512* (2013.01); *G02F 1/1339* (2013.01)

(58) Field of Classification Search
None
See application file for complete search history.

(56) References Cited

U.S. PATENT DOCUMENTS 7,986,394 B2 7/2011 Kamoshida
9,740,037 B2 8/2017 Lee et al.
(Continued)

FOREIGN PATENT DOCUMENTS

CN 101201486 6/2008
CN 104007575 8/2014
(Continued)

OTHER PUBLICATIONS

International Search Report and Written Opinion dated Nov. 21, 2019 for PCT Patent Application No. PCT/CN2019/097509.
(Continued)

*Primary Examiner* — Shan Liu
(74) *Attorney, Agent, or Firm* — Thomas | Horstemeyer, LLP (57) ABSTRACT

The present disclosure relates to the field of display technologies and proposes a curved display panel. The curved display panel includes a first substrate provided with a first groove in a non-display area of the first substrate; a second substrate provided with a second groove in a non-display area of the second substrate, the second groove being disposed corresponding to the first groove; and a fixing spacer disposed between the first substrate and the second substrate, and having a first end located in the first groove and a second end located in the second groove.

13 Claims, 9 Drawing Sheets

(56) References Cited

U.S. PATENT DOCUMENTS

| | | |
|---|---|---|
| 10,061,153 B2 | 8/2018 | Hirata et al. |
| 10,254,579 B2 | 4/2019 | Park et al. |
| 10,416,490 B2 | 9/2019 | Hirata et al. |
| 2004/0070740 A1* | 4/2004 | Irie .................... G03F 7/70475 355/52 |
| 2006/0049408 A1* | 3/2006 | Sohn .................... G02F 1/1333 257/72 |
| 2008/0137013 A1 | 6/2008 | Kamoshida |
| 2014/0092356 A1 | 4/2014 | Ahn et al. |
| 2015/0370121 A1* | 12/2015 | Wu .................... G02F 1/133512 349/106 |
| 2016/0077376 A1* | 3/2016 | Lee .................... G02F 1/1339 349/106 |
| 2016/0195761 A1 | 7/2016 | Liu et al. |
| 2017/0146833 A1* | 5/2017 | Sun .................... G02F 1/1341 |
| 2017/0285392 A1 | 10/2017 | Hirata et al. |
| 2018/0031906 A1 | 2/2018 | Park et al. |
| 2018/0101074 A1 | 4/2018 | Xie et al. |
| 2018/0136511 A1 | 5/2018 | Kudo et al. |
| 2018/0335663 A1 | 11/2018 | Hirata et al. |

FOREIGN PATENT DOCUMENTS

| | | |
|---|---|---|
| CN | 104460124 | 3/2015 |
| CN | 104777679 | 7/2015 |
| CN | 105629561 | 6/2016 |
| CN | 107664859 | 2/2018 |
| CN | 107784937 | 3/2018 |
| CN | 108072996 | 5/2018 |
| CN | 108375850 | 8/2018 |
| CN | 109143669 | 1/2019 |
| EP | 3276404 | 1/2018 |
| JP | H08211395 | 8/1996 |
| JP | 2007333818 | 12/2007 |

OTHER PUBLICATIONS

1st Office Action dated Apr. 23, 2020 for Chinese Patent Application No. 201811092294.X.

* cited by examiner

CURVED DISPLAY PANEL, MANUFACTURING METHOD THEREOF AND DISPLAY DEVICE

CROSS-REFERENCE

The present application is a 35 U.S.C. § 371 national phase application based upon International Application No. PCT/CN2019/097509, filed on Jul. 24, 2019, which claims the benefit of and priority to Chinese Patent Application No. 201811092294.X filed on Sep. 19, 2018, the entire contents of which are hereby incorporated by reference.

TECHNICAL FIELD

The present disclosure relates to the field of display technologies and, in particular, to a curved display panel, a method for manufacturing a curved display panel, and a display device installed with the curved display panel.

BACKGROUND

Currently, flexible and curved display technologies are receiving increasing attention in the display panel industry. Compared with OLED (Organic Light-Emitting Diode) displays, LCD (Liquid Crystal Display) still has many advantages such as high yield, low cost, and good reliability. Therefore, a flexible and curved LCD is also one of the important directions for future development in the display panel industry.

Therefore, it is necessary to study a new curved display panel, a method for manufacturing a curved display panel, and a display device installed with the curved display panel.

The information disclosed in the Background section above is only for enhancing the understanding of the background of the present disclosure and thus, may include information that does not constitute prior art known to those of ordinary skill in the art.

SUMMARY

The present disclosure provides a curved display panel, a method for manufacturing a curved display panel, and a display device installed with the curved display panel.

Additional aspects and advantages of the present disclosure will be set forth in part in the following description, and will become apparent in part from the description, or may be learned through the practice of the present disclosure.

According to an aspect of the present disclosure, there is provided a curved display panel, including: a first substrate; a second substrate, disposed corresponding to the first substrate; and a black matrix, located on the second substrate and including a pixel-defining structure and a compensation structure, each of the compensation structures having a first width along a first direction and a second width along a second direction perpendicular to the first direction, wherein the first width is positively correlated to a distance from the same to a curving center axis, and an extending direction of the curving center axis is parallel to the second direction.

In some embodiments of the present disclosure, the first widths of the compensation structures having a same distance from the curving center axis along the first direction are the same.

In some embodiments of the present disclosure, the second width of each of the compensation structures is substantially the same.

In some embodiments of the present disclosure, the curved display panel includes: a first substrate, provided with a first groove in a non-display area of the first substrate; a second substrate, provided with a second groove in a non-display area of the second substrate, the second groove being disposed corresponding to the first groove; and a fixing spacer, disposed between the first substrate and the second substrate, and having a first end located in the first groove and a second end located in the second groove.

In some embodiments of the present disclosure, the curved display panel further includes: a sealant layer, adhered between the fixing spacer and the first substrate, and between the fixing spacer and the second substrate, the sealant layer being a rigid sealant layer.

In some embodiments of the present disclosure, the first groove is disposed in a planarization layer of the first substrate, and includes: two first sub-grooves, each being arranged in a cross shape, a connecting line of central points of the two first sub-grooves and a fixing center axis of the first substrate being arranged in a collinear way; and four second sub-grooves, disposed at four corner parts of the planarization layer respectively, the second sub-groove including a second horizontal sub-groove parallel to a horizontal side of the planarization layer and a second longitudinal sub-groove parallel to a longitudinal side of the planarization layer, and one end of the second horizontal sub-groove close to the longitudinal side of the planarization layer being communicated with one end of the second longitudinal sub-groove close to the horizontal side of the planarization layer.

In some embodiments of the present disclosure, the second groove is disposed in a coating protection layer of the second substrate and extends onto the black matrix, and the second groove includes: two third sub-grooves, each being arranged in the cross shape, and a connecting line of central points of the two third sub-grooves and a fixing center axis of the second substrate being arranged in the collinear way; and four fourth sub-grooves, disposed at four corner parts of the coating protection layer respectively, the fourth sub-groove including a fourth horizontal sub-groove parallel to a horizontal side of the coating protection layer and a fourth longitudinal sub-groove parallel to a longitudinal side of the coating protection layer, and one end of the fourth horizontal sub-groove close to the longitudinal side of the coating protection layer being communicated with one end of the fourth longitudinal sub-groove close to the horizontal side of the coating protection layer.

According to an aspect of the present disclosure, there is a method for manufacturing a curved display panel, the curved display panel including a first substrate and a second substrate, the second substrate including a black matrix. The method includes: obtaining a target value of the black matrix; forming the black matrix according to the target value; forming a first groove in a non-display area of the first substrate; forming a second groove in a non-display area of the second substrate, the second groove being disposed corresponding to the first groove; and forming a fixing spacer, having a first end located in the first groove and a second end located in the second groove.

In some embodiments of the present disclosure, the method further includes adhering the fixing spacer to the first substrate and the second substrate by using a sealant.

In some embodiments of the present disclosure, the sealant is a rigid sealant.

In some embodiments of the present disclosure, the step of obtaining a target value of the black matrix includes: fixing a test display panel along a center axis parallel to a display surface, and curving and fixing both sides of the test display panel parallel to the center axis; obtaining a pixel shift image of the test display panel after the test display panel is curved; simulating pixel shift information according to the pixel shift image; obtaining a cross-color distribution of the test display panel according to simulated pixel shift information; obtaining a black matrix compensation value according to the cross-color distribution; and obtaining the target value according to the black matrix compensation value.

According to an aspect of the present disclosure, there is provided a method for manufacturing a curved display panel, including: providing a first substrate; providing a second substrate, the second substrate being disposed corresponding to the first substrate; and forming a black matrix on the second substrate, the black matrix including a pixel-defining structure and a compensation structure, each of the compensation structure having a first width along a first direction and a second width along a second direction perpendicular to the first direction, wherein the first width is positively correlated to a distance from the same to a curving center axis, and an extending direction of the curving center axis is parallel to the second direction.

In some embodiments of the present disclosure, the first width of the compensation structure is obtained by a method including: fixing a test display panel along a center axis parallel to a display surface, and curving and fixing both sides of the test display panel parallel to the center axis; obtaining a pixel shift image of the test display panel after the test display panel is curved; simulating pixel shift information according to the pixel shift image; obtaining a cross-color distribution of the test display panel according to simulated pixel shift information; and obtaining a black matrix compensation value according to the cross-color distribution, the black matrix compensation value being the first width of the compensation structure.

According to an aspect of the present disclosure, there is provided a display device, including any one of the curved display panels.

BRIEF DESCRIPTION OF THE DRAWINGS

The above and other features and advantages of the present disclosure will become more apparent by describing example embodiments thereof in detail with reference to the accompanying drawings.

DETAILED DESCRIPTION

Example embodiments will now be described more fully with reference to the accompanying drawings. However, the embodiments can be implemented in a variety of forms and should not be construed as being limited to the examples set forth herein; rather, these embodiments are provided so that this disclosure will be more complete so as to convey the idea of the exemplary embodiments to those skilled in this art. The same reference numerals in the drawings denote the same or similar parts, and the detailed description thereof will be omitted.

Figure 1:
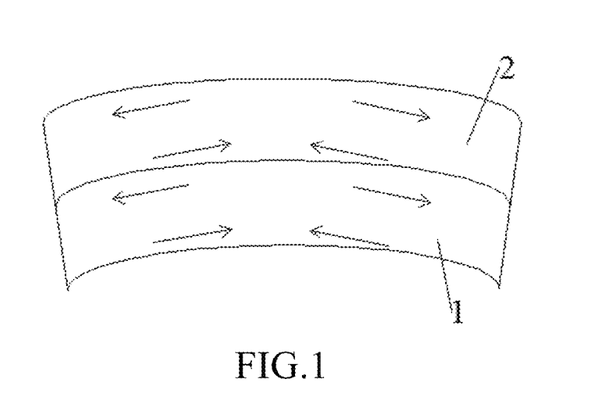
FIG. 1 is a schematic diagram of a simulation structure of a flexible or curved display panel in the prior art in which an array substrate and a color filter substrate slide when being curved.
Figure 2:
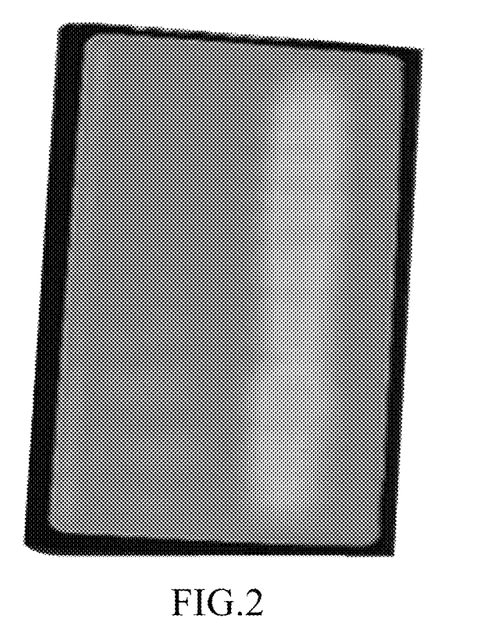
FIG. 2 is a schematic diagram of a flexible or curved display panel in the prior art only having yellow cross-color when it is curved.
Figure 3:
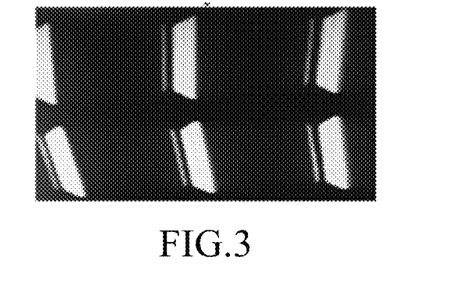
FIG. 3 is an enlarged schematic diagram of some pixels in FIG. 2.
Figure 4:
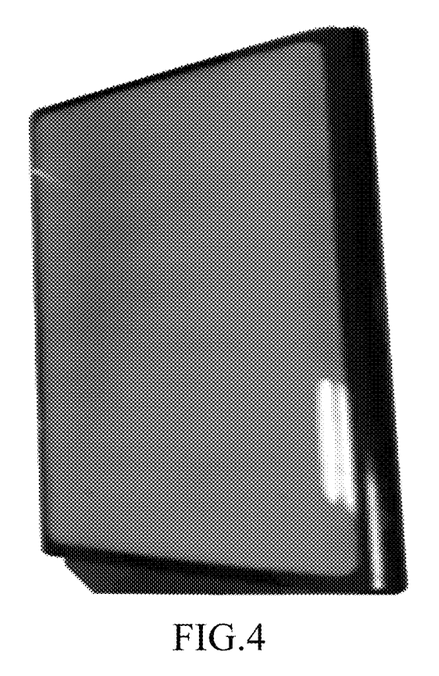
FIG. 4 is a schematic diagram of a flexible or curved display panel in the prior art only having blue cross-color when being curved.
Figure 5:
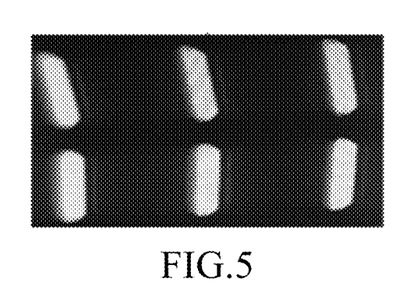
FIG. 5 is an enlarged schematic diagram of some pixels in FIG. 4.

FIG. 1 is a schematic diagram of a simulation structure of a flexible or curved display panel in the prior art in which an array substrate and a color filter substrate slide when the flexible or curved display panel is curved. Referring to FIG. 1, when the flexible or curved display panel is curved, both of an array substrate 1 and a color filter substrate 2 slide, the upper substrate slides to both sides, and the lower substrate slides to the center, so that positions of an pixel electrode on the array substrate 1 and an opening area on the color filter substrate 2 slide, resulting in a phenomenon that other pixels will be driven when a certain pixel is driven. For example, when a green pixel is driven, liquid crystal in a red or blue opening area is deflected, resulting in a screen presenting anon-uniform display of yellow cross-color or purple cross-color, referring to the schematic diagrams of the cross-color distributions of the display panel in the prior art when being curved shown in FIG. 2 to FIG. 5. In some cases, only yellow cross-color appears, while in some cases, only blue cross-color appears. At present, the cross-color distribution of each display panel after being curved is not fixed, so that it is difficult to achieve compensation within the pixel. Therefore, it is necessary to develop a new curved display panel, a method for manufacturing a curved display panel, and a display device installed with the curved display panel.

The present disclosure first provides a method for manufacturing a curved display panel. The curved display panel includes a first substrate 1A and a second substrate 2A. The second substrate 2A includes a black matrix 24.

In an embodiment of the present disclosure, the first substrate 1A may be an array substrate and the second substrate 2A may be a color filter substrate, but the present disclosure is not limited thereto.

Figure 6:
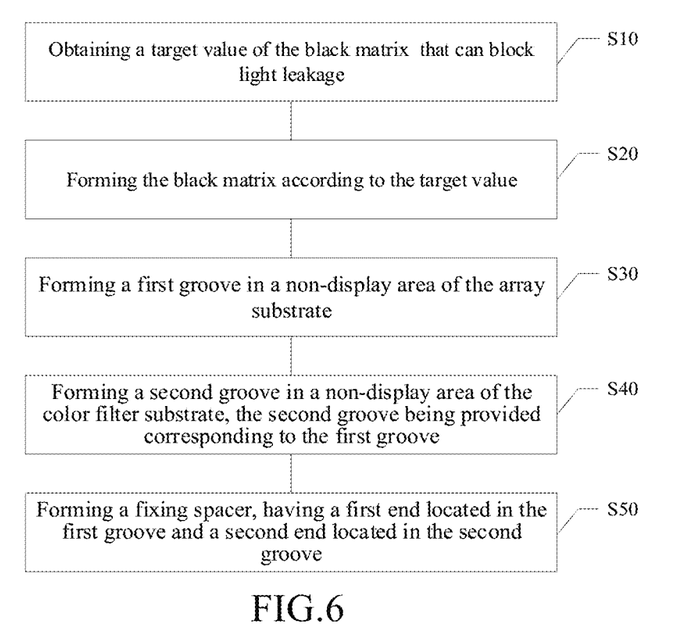
FIG. 6 is a schematic flow block diagram of an exemplary embodiment of a method for manufacturing a curved display panel according to the present disclosure.

Referring to FIG. 6, an embodiment of the present disclosure provides a method for manufacturing a curved display panel, including: providing a first substrate 1A; providing a second substrate 2A, the second substrate being disposed corresponding to the first substrate; and forming the black matrix 24 on the second substrate, the black matrix including a pixel-defining structure B1 and a compensation structure B2, each of the compensation structure having a first width W1 along a first direction and a second width W2 along a second direction perpendicular to the first direction.

The first width is positively correlated to a distance from the compensation structure to a curving center axis, and an extending direction of the curving center axis is parallel to the second direction.

A method for obtaining the first width W1 of the compensation structure includes: fixing a test display panel along a center axis parallel to a display surface, and curving and fixing both sides of the test display panel parallel to the center axis; obtaining a pixel shift image of the test display panel after being curved; simulating pixel shift information according to the pixel shift image; obtaining a cross-color distribution of the test display panel according to simulated pixel shift information; and obtaining a black matrix compensation value according to the cross-color distribution, the black matrix compensation value being the first width of the compensation structure.

The detailed process of obtaining the black matrix compensation value will be described below.

FIG. 6 is a schematic flow block diagram of an exemplary embodiment of a method for manufacturing a curved display panel according to the present disclosure. Referring to FIG. 6, the method for manufacturing a curved display panel may include the following steps.

In Step S10, a target value of the black matrix 24 that can block light leakage is obtained.

In step S20, the black matrix 24 is formed according to the target value.

In step S30, a first groove is formed in a non-display area of the first substrate 1A.

In step S40, a second groove is formed in a non-display area of the second substrate 2A, the second groove being provided corresponding to the first groove.

In step S50, a fixing spacer 6 is formed, the fixing spacer 6 having a first end located in the first groove and a second end located in the second groove.

Each step of the method for manufacturing a curved display panel is described in detail below.

In Step S10, a target value of the black matrix 24 is obtained.

Figure 7:
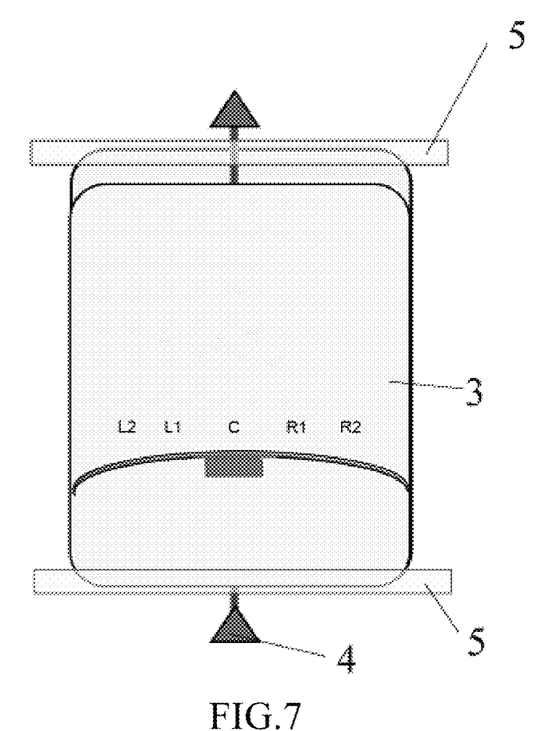
FIG. 7 is a schematic structural diagram of a test display panel after being curved and fixed.

In the present exemplary embodiment, the target value of the black matrix 24 of a test display panel 3 that can block light leakage is obtained. The test display panel 3 is a curved display panel in the prior art, that is, a curved display panel in which the cross-color appears after being curved. FIG. 7 is a schematic structural diagram of the test display panel 3 after being curved and fixed. In FIG. 7, c indicates a position of the fixing center axis of the curved display panel, L1 indicates a first position on the left of the fixing center axis, L2 indicates a second position on the left of the fixing center axis, R1 indicates a first position on the right of the fixing center axis, and R2 indicates a second position on the right of the fixing center axis. The specific curving method for the test display panel 3 is as follows: first, a back surface of the test display panel 3 is fixed on a fixing axis 4 along a fixing center axis in a length direction parallel to the display surface. A thickness of the fixing axis 4 is greater than or equal to 1 mm and less than or equal to 1.50 mm, a width thereof is greater than or equal to 0.8 mm and less than or equal to 1.2 mm, and a length thereof is at least about 3 mm longer than the length of the test display panel 3. Then, the test display panel 3 is placed on a flat machine, and both sides of the test display panel 3 that are parallel to the fixing axis 4 are curved toward the non-display surface, and finally can be fixed by a transparent tape 5.

Of course, the back surface of the test display panel 3 can also be fixed on the fixing axis 4 along the fixing center axis in a width direction parallel to the display surface. Specifically, whether the back surface of the test display panel 3 is fixed along the center axis in the width direction or the center axis in the length direction is determined according to the center axis, where an actual product is curved with respect to the center axis.

Figure 8:
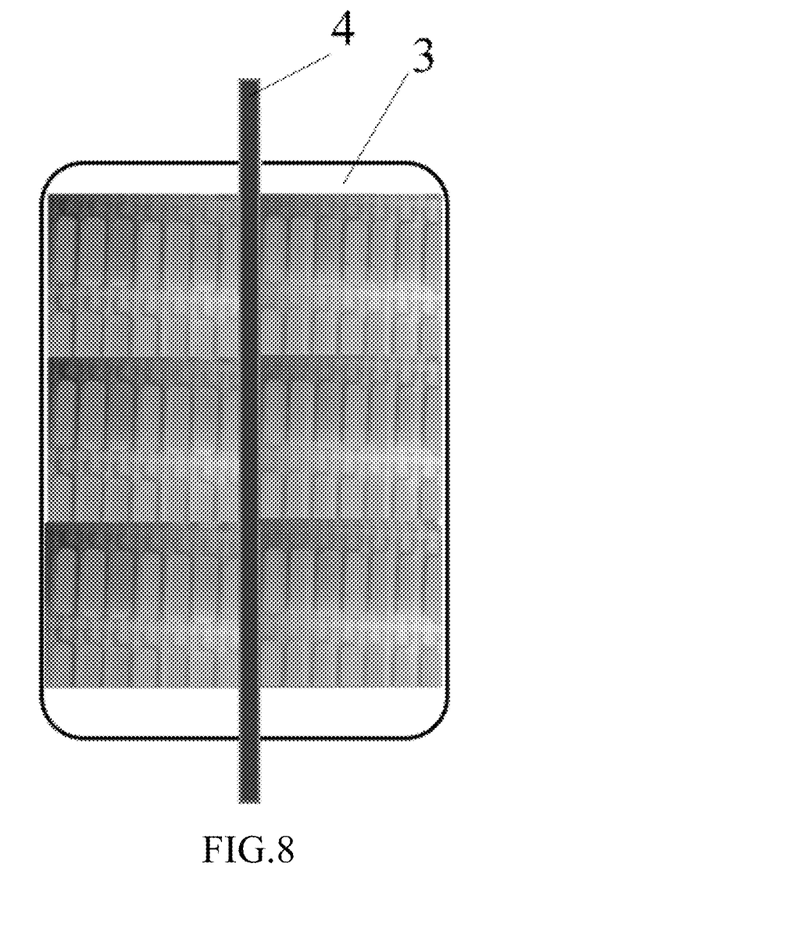
FIG. 8 is a schematic diagram of a pixel shift image of the test display panel in FIG. 7 obtained through a microscope.

In this exemplary embodiment, a pixel shift image of the test display panel 3 after being curved is obtained through a microscope. Specifically, the pixel shift image of the test display panel 3 after being curved is obtained through the microscope and a camera disposed on an eyepiece, and the camera transmits the pixel shift image to a data processing unit. The data processing unit may be a single-chip microcomputer, a microprocessor, an industrial computer, and so on. FIG. 8 is a schematic diagram of a pixel shift image of the test display panel 3 in FIG. 7 obtained through a microscope, and referring to FIG. 8, it can be seen that the pixels on the left side of both sides of the fixing center axis are shifted towards to the right, and the pixels on the right side of both sides of the fixing center axis are shifted towards to the left.

Figure 9:
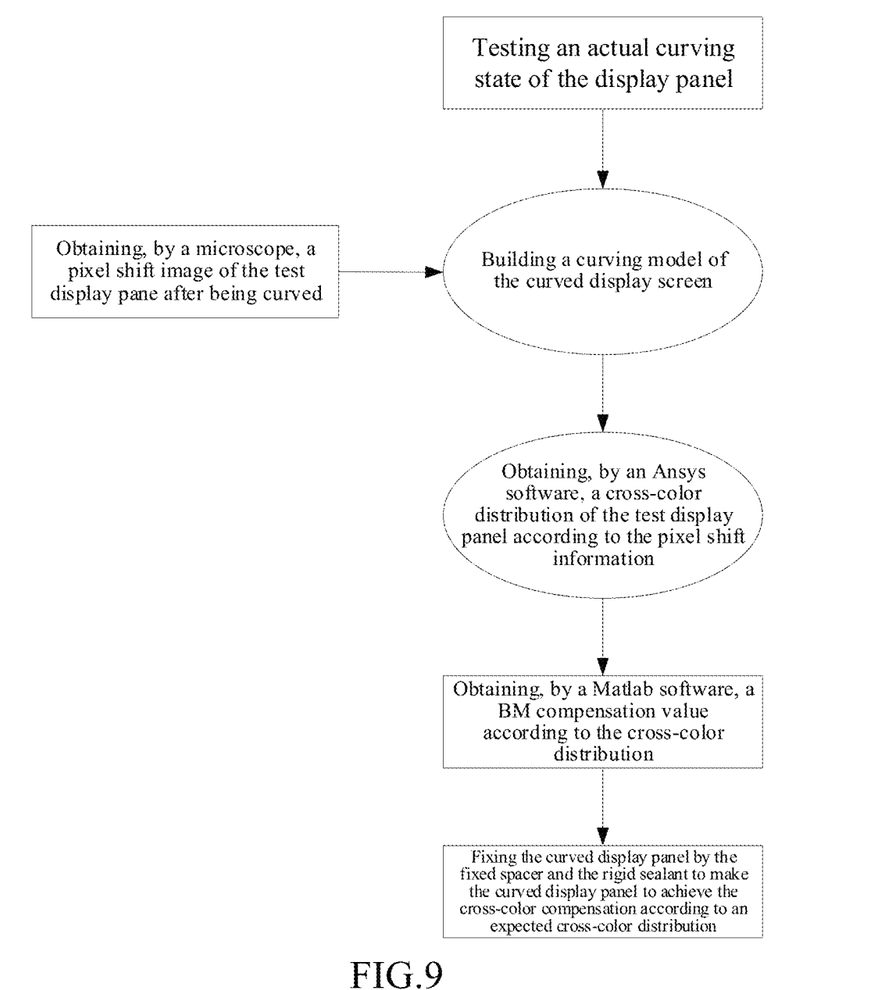
FIG. 9 is a schematic flow block diagram of an exemplary embodiment of a method for manufacturing a curved display panel according to the present disclosure.
Figure 10:
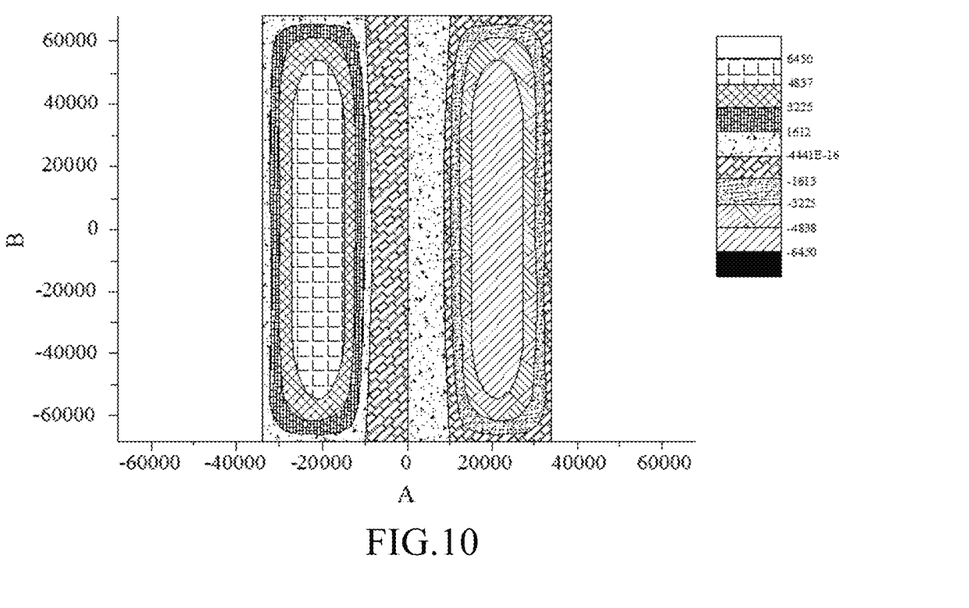
FIG. 10 is a schematic diagram of a cross-color distribution of the test display panel in FIG. 7 simulated by software.

FIG. 9 is a schematic flow block diagram of an exemplary embodiment of a method for manufacturing a curved display panel according to the present disclosure. Referring to FIG. 9, a pixel shift image of the test display panel 3 after being curved is obtained through a microscope, and an actual curving state of the test display panel 3 is input into a data processing unit. The actual curving state may include a size, thickness, center axis, and curving radian of the test display panel 3 when being curved. The data processing unit simulates pixel shift information according to the pixel shift image and the actual curving state, so as to build a curved display screen model. Then the data processing unit obtains a cross-color distribution of the test display panel 3 according to the pixel shift information through an Ansys® software application. FIG. 10 is a schematic diagram of a cross-color distribution of the test display panel in FIG. 7 simulated by the software, and referring to FIG. 10, it can be seen that red cross-color mainly appears on the left, while blue cross-color cross mainly appears on the right. The data processing unit obtains a BM compensation value according to the cross-color distribution by calculation through a Matlab® software application, and finally the target value is obtained according to the BM compensation value.

The specific steps for obtaining the cross-color distribution of the test display panel 3 according to the pixel shift information by the Ansys® software application can refer to related technologies, which are not described herein again. The calculating and obtaining of the BM compensation value through the Matlab® software application can also refer to related technologies, which will not be repeated here.

Figure 15:
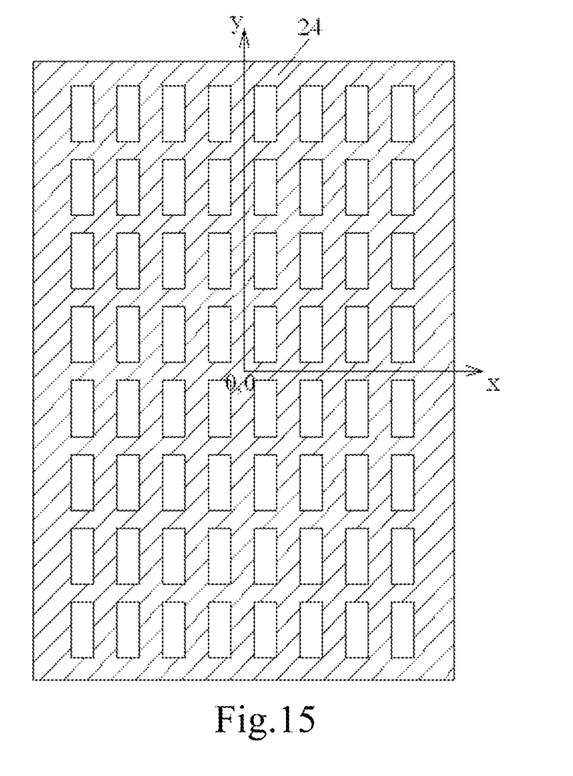
FIG. 15 is a schematic structural diagram of a curved display panel before compensation.
Figure 16:
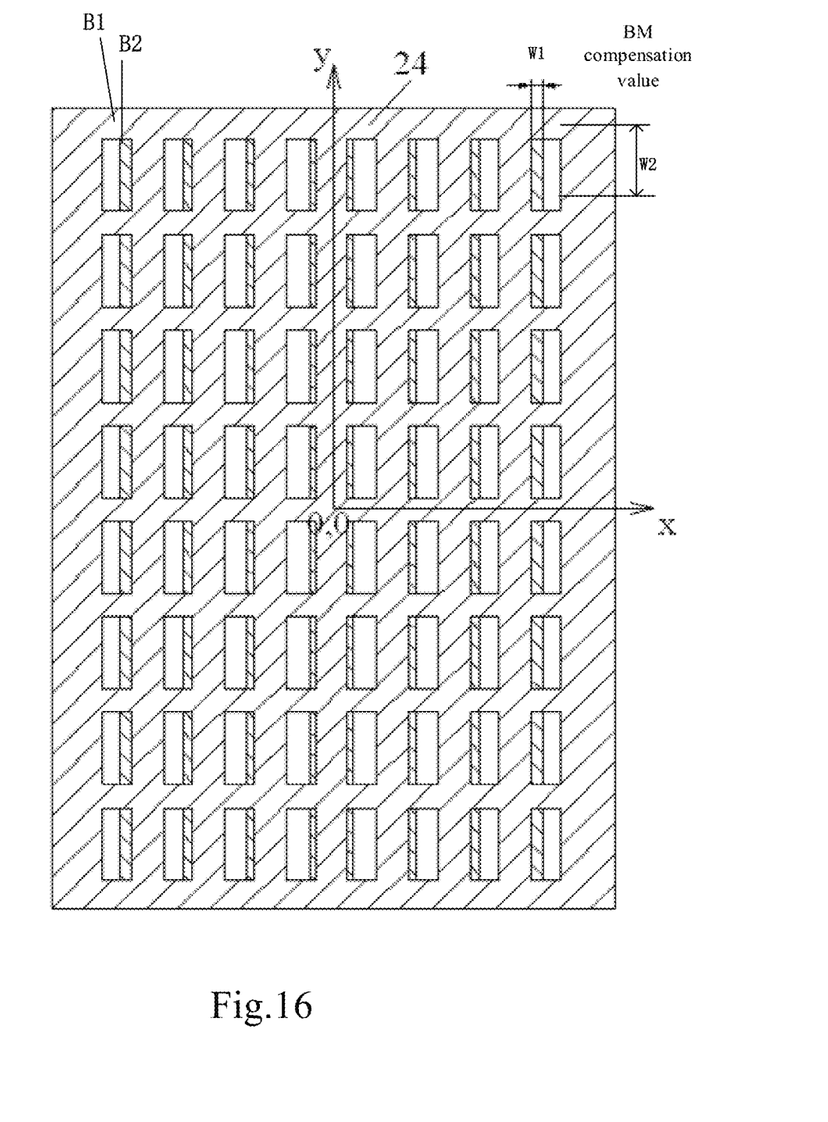
FIG. 16 is a schematic structural diagram of the curved display panel in FIG. 15 after compensation.

The target value is a sum of a basic value and the BM compensation value. The basic value is the value of the black matrix 24 in the prior art. The BM compensation value is a value that the black matrix 24 needs to be enlarged to ensure that the light leakage is blocked. Referring to FIG. 15 and FIG. 16, the center position of the curved display panel is used as the origin of a coordinates and a rectangular coordinate system is established. The coordinate axis parallel to the fixing axis 4 is the y axis (here, it is assumed that the y axis is the fixing center axis of the array substrate and the color filter substrate), and the coordinate axis perpendicular to the fixing axis 4 is the x-axis. From FIG. 16, it can be seen that the black matrix can block light leakage of each pixel in the direction perpendicular to the x axis after the curved display panel is curved. Specifically, the size of the black matrix in the y-axis direction is not changed, the size thereof in the x-axis direction is changed, and the compensation position of the black matrix is at the side of the black matrix near the y-axis. The black matrix compensation values (BM compensation values) of the second substrate are symmetrically distributed about the fixing center axis (y-axis in the figure) of the second substrate. The compensation values of the black matrices, which are parallel to and have the same interval from the fixing center axis of the second substrate, are the same, that is, the black matrices in the same column have the same compensation value, and that also is, the changes of the sizes of the black matrices with the same abscissa in the x-axis direction are the same. The black matrix compensation value is gradually increased as a distance from the fixing center axis of the second substrate is increased. That is, the compensation value of black matrix close to the y axis is smaller than that of the black matrix away from the y axis, and the farther away from the y axis, the larger the black matrix compensation value.

In an embodiment of the present disclosure, the curved display panel may include two short sides parallel to each other and two long sides parallel to each other (for example, a general plan view of a smart phone is an approximate rectangle with long sides and short sides). The x-axis is parallel to the short side of the curved display panel, and the y-axis is parallel to the long side of the curved display panel, but the present disclosure is not limited thereto.

In step S20, the black matrix is formed according to the target value.

In this exemplary embodiment, a black matrix material layer is deposited first, and then the black matrix material layer is patterned according to the target value, so that the black matrix can block light leakage.

In step S30, a first groove is formed in a non-display area of the first substrate.

In this exemplary embodiment, the first groove may be provided in the planarization layer 13 as the uppermost layer of the non-display area B of the first substrate 1A, that is, is the planarization layer 13 of the first substrate 1A attached to the sealant layer 8. Of course, in a case where the material layer of the non-display area B of the first substrate 1A attached to the sealant layer 8 is not the planarization layer 13 but a passivation layer, the first groove may be provided in the passivation layer. In order to increase the depth of the first groove, the first groove may also extend downward to the next material layer. For example, the first groove may also extend into the gate insulating layer 14 adjacent to the planarization layer 13.

Figure 11:
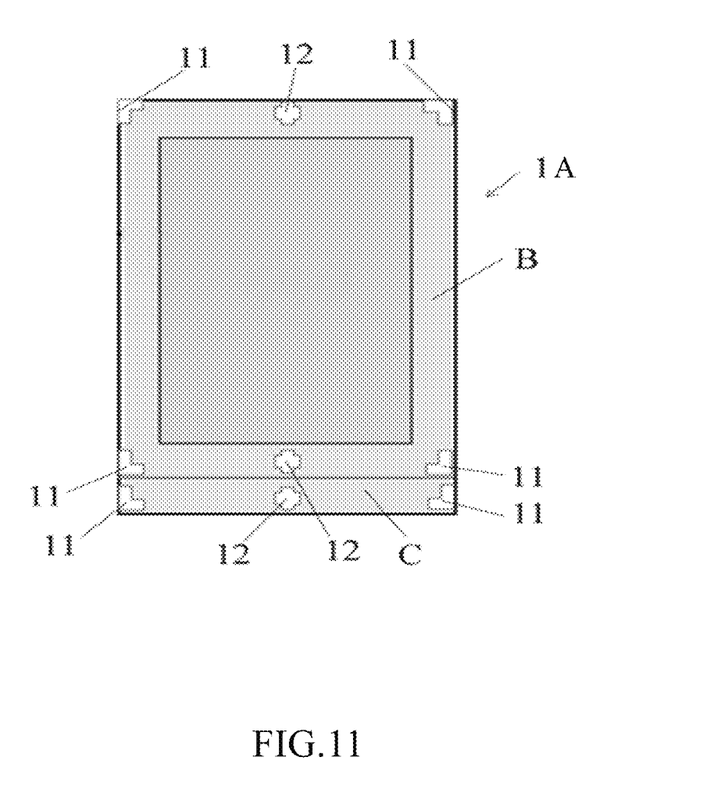
FIG. 11 is a schematic structural diagram of a first substrate.

FIG. 11 is a schematic structural diagram of the first substrate 1A. Referring to FIG. 11, the first groove may include four second sub-grooves 11 and two first sub-grooves 12. The four second sub-grooves 11 are respectively disposed at four corner parts of the planarization layer 13. The second sub-grooves 11 can be set in a right-angled corner shape, and the corners of the second sub-grooves 11 and the corners of the planarization layer 13 are consistent. Specifically, the second sub-groove 11 may include a second horizontal sub-groove that is parallel to the horizontal side of the planarization layer 13 and a second longitudinal sub-groove that is parallel to the longitudinal side of the planarization layer 13. One end of the second horizontal sub-groove close to the longitudinal side of the planarization layer 13 is communicated with one end of the second longitudinal sub-groove close to the horizontal side of the planarization layer 13. Of course, the depth of the second longitudinal sub-groove is the same as the depth of the second horizontal sub-groove.

In the present exemplary embodiment, the first sub-groove 12 may be provided in a cross shape. A connecting line of central points of the two first sub-grooves 12 and a fixing center axis (in the embodiment of the present disclosure, the curved display panel is formed after the color filter substrate and the array substrate are disposed opposite to each other, therefore, it can be considered that the fixing center axis of the first substrate and the fixing center axis of the second substrate are coincident) of the first substrate 1A are arranged in a collinear way. The fixing center axis of the first substrate is the center axis in the longitudinal direction of the first substrate 1A. The fixing center axis of the first substrate is parallel to the display surface, and when the curved display panel is curved, the fixing center axis of the first substrate is used as the center axis. That is, the two long sides parallel to the fixing center axis of the first substrate and symmetrical with respect to the fixing center axis of the first substrate are curved toward the side of the non-display surface or the display surface to form the curved display panel.

In this exemplary embodiment, the first groove is also provided in a cut area C of the first substrate 1A. Two second sub-grooves 11 are respectively disposed at two outside corners of the cut area C, and one first sub-groove 12 is disposed in the middle of the two second sub-grooves 11. Such arrangement can enhance the fixing of the first substrate 1A and the second substrate 2A.

In addition, those skilled in the art can understand that the second sub-groove 11 and the first sub-groove 12 can also be disposed in a same shape, for example, in a shape such as a cylindrical shape, a cuboid shape, and the like.

In step S40, a second groove is formed in a non-display area of the second substrate 2A. The second groove is provided corresponding to the first groove.

Figure 12:
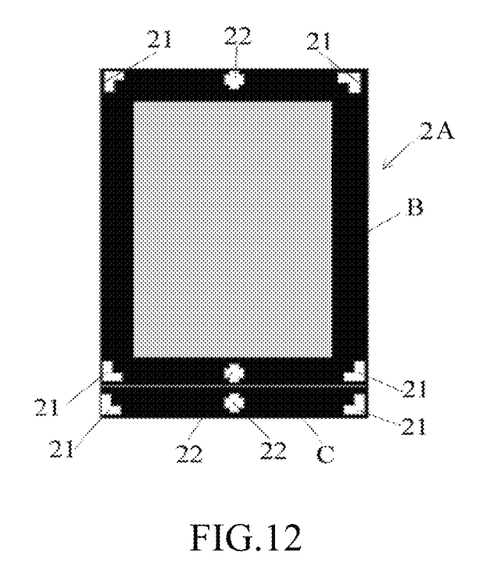
FIG. 12 is a schematic structural diagram of a second substrate.

In this exemplary embodiment, the second groove may be provided in the coating protection layer 23 as the lowest layer of the non-display area B of the second substrate 2 and may extend into the black matrix 24 adjacent to the coating protection layer 23, that is, be provided in the coating protection layer 23 of the second substrate 2A attached to the sealant layer 8 and the black matrix 24 adjacent to the coating protection 23. Of course, in a case where the material layer of the non-display area B of the second substrate 2 attached to the sealant layer 8 is not the coating protection layer 23 but another material layer, the first groove may be provided in another material layer. The depth of the second groove can be increased by disposing the second groove in the coating protection layer 23 and the black matrix 24 adjacent to the coating protection layer 23. Of course, the second groove may also be provided only in the coating protection layer 23 and not in the black matrix 24.

FIG. 12 is a structural diagram of the second substrate 2A. Referring to FIG. 12, the second groove may include four fourth sub-grooves 21 and two third sub-grooves 22. The four fourth sub-grooves 21 are respectively disposed at four corner parts of the coating protection layer 23 and the black matrix 24, the fourth sub-grooves 21 can be disposed in a right-angled corner shape, and the corners of the fourth sub-grooves 21 and the corners of the coating protection layer 23 and the black matrix 24 are consistent. Specifically, the coating protection layer 23 of the non-display area B has the same shape as the black matrix 24. The specific structure of the fourth sub-groove 21 will be described below by taking the coating protection layer 23 as the illustrating object. The fourth sub-grooves 21 may include a fourth horizontal sub-groove that is parallel to the horizontal side of the coating protection layer 23 and a fourth longitudinal sub-groove that is parallel to the longitudinal side of the coating protection layer 23. One end of the fourth horizontal sub-groove close to the longitudinal side of the coating protection layer 23 is communicated with one end of the fourth longitudinal sub-groove close to the horizontal side of the coating protection layer 23. Of course, the depth of the fourth longitudinal sub-groove is the same as the depth of the fourth horizontal sub-groove. The four fourth sub-grooves 21 are symmetrically arranged in one-to-one correspondence with the four second sub-grooves 11.

In the present exemplary embodiment, the third sub-groove 22 may be provided in a cross shape. A connecting line of central points of the two third sub-grooves 22 and a fixing center axis of the second substrate 2A are arranged in a collinear way. The fixing center axis of the second substrate is the center axis in the longitudinal direction of the second substrate 2A. The fixing center axis of the second substrate is parallel to the display surface, and when the curved display panel is curved, the fixing center axis of the second substrate is used as the center axis, that is, the two long sides parallel to the fixing center axis of the second substrate 2A and symmetrical with respect to the fixing center axis of the second substrate 2A are curved toward the side of the non-display surface or the display surface to form a curved display panel. The fixing center axis of the second substrate 2A and the fixing center axis of the first substrate 1A are arranged up and down and in parallel with each other. The two third sub-grooves 22 and the above described two first sub-grooves 12 are arranged up and down and in one-to-one correspondence with each other.

In this exemplary embodiment, the second groove is also provided in the cut area C of the second substrate 2A. Two fourth sub-grooves 21 are respectively disposed at two outside corners of the cut area C, and one third sub-groove 22 is disposed in the middle of the two fourth sub-grooves 21. Such arrangement can enhance the fixing of the first substrate 1A and the second substrate 2A.

In addition, those skilled in the art can understand that the fourth sub-groove 21 and the third sub-groove 22 can also be disposed in a same shape, for example, in a cylindrical or cuboid shape.

In step S50, a fixing spacer 6, with a first end in the first groove and a second end in the second groove, is formed.

In this example embodiment, the fixing spacer 6 can be formed by a deposition method, the shape of the fixing spacer 6 is consistent with the shape of the first groove, and the first end of the fixing spacer 6 substantially occupies the volume of the first groove to prevent liquid crystal from flowing into the first groove, thereby preventing the first groove from affecting the quantity of liquid crystal. The height of the fixing spacer 6 is substantially equal to the sum of the depth of the first groove, the depth of the second groove, and the thickness of the liquid crystal layer 7 provided between the first substrate 1A and the second substrate 2A.

Figure 13:
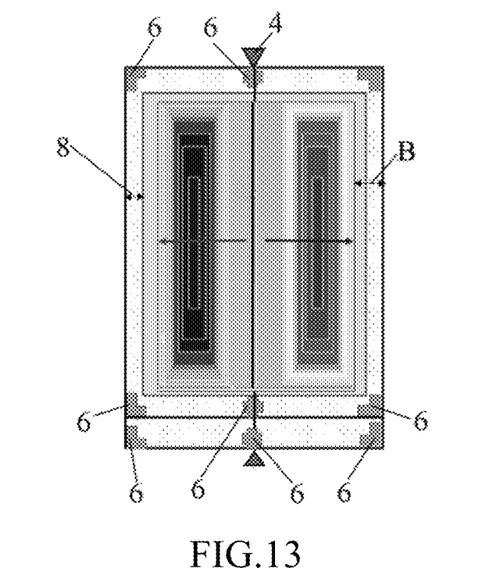
FIG. 13 is a schematic structural diagram of the first substrate in FIG. 11 and the second substrate in FIG. 12 after being disposed opposite to each other.
Figure 14:
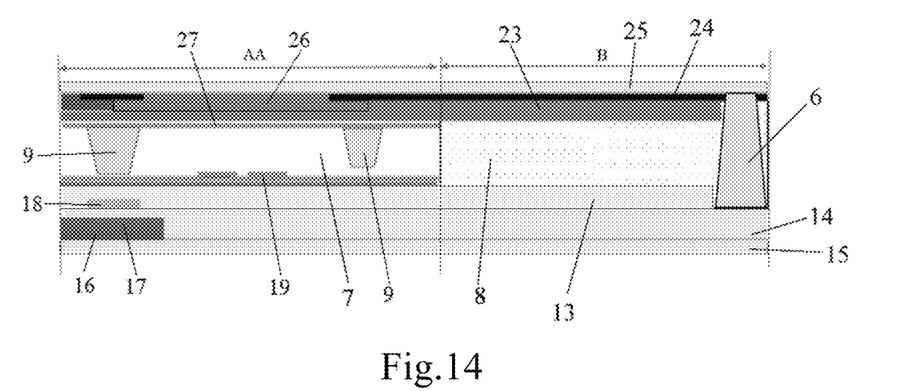
FIG. 14 is a schematic sectional view of FIG. 13.

FIG. 13 and FIG. 14 are schematic structural diagrams of the first substrate in FIG. 11 and the second substrate in FIG. 12 after being disposed opposite to each other. Referring to FIGS. 13 and 14, after the second substrate 2A and the first substrate 1A are disposed opposite to each other, the second end of the fixing spacer 6 inserts into the second groove due to the first groove and the second groove provided correspondingly. The second end of the fixing spacer 6 substantially occupies the volume of the second groove to prevent liquid crystal from flowing into the second groove, thereby preventing the second groove from affecting the quantity of liquid crystal.

The two first sub-grooves 12, two third sub-grooves 22, and the fixing spacer 6 provided therein fix the center axis of the curved display panel, so that the curved display panel have the same curving as the test display panel 3 in the subsequent curving process, and thus the cross-color distribution of the curved display panel are basically consistent to provide precondition for compensation within pixels.

In the present exemplary embodiment, after the first substrate and the second substrate are disposed opposite to each other, the cut area C may be cut off first, and then the fixing spacer 6 and the first substrate 1A are bonded together with a rigid sealant, and the fixing spacer 6 and the second substrate 2A are also bonded together with the rigid sealant. The rigid sealant can be formed to be in a circle, and the rigid sealant can be bonded between the second substrate 2A and the first substrate 1A, thereby bonding the fixing spacer to the first substrate 1A and the second substrate 2A. The width of the rigid sealant is less than or equal to the width of the non-display area B, and is formed to be in a circle near the outside. The rigid sealant further strengthens the fixing of the second substrate 2A and the first substrate 1A. According to the performance classification after being applied, the sealant can be divided into two types: a curing sealant and a semi-curing sealant. The curing sealant can be divided into the rigid sealant and a flexible sealant. The solid formed by vulcanization or solidification of the rigid sealant is rarely elastic and cannot be curved, usually the joints cannot be moved; the flexible sealant is elastic and soft after vulcanization.

Further, the present disclosure also provides a curved display panel prepared by using the method for manufacturing a curved display panel. FIG. 13 and FIG. 14 are schematic structural diagrams of the first substrate in FIG. 11 and the second substrate in FIG. 12 after being disposed opposite to each other, that is, schematic structural diagrams of the curved display panel of the present disclosure. Referring to FIGS. 13 and 14, the curved display panel may include a first substrate 1A, a second substrate 2A, and a fixing spacer 6.

The first substrate 1A may include a display area AA and a non-display area B. The first substrate 1A in the non-display area B may include a lower glass substrate 15, a gate insulation layer 14, and a planarization layer 13 disposed in order from bottom to top, and the first substrate 1A in the display area AA may include the lower glass substrate 15, a dielectric layer 16, a gate 17, a gate insulating layer 14, a source/drain 18, the planarization layer 13, and a pixel electrode 19 disposed in order from bottom to top. The second substrate 2A may include a display area AA and a non-display area B. The second substrate 2A in the non-display area B may include a coating protection layer 23, a black matrix 24, and an upper glass substrate 25 provided in order from bottom to top; and the second substrate 2A in the display area B may include a common electrode 27, the coating protection layer 23, a pixel layer 26, and an upper glass substrate 25 provided in order from bottom to top.

The black matrix includes a pixel-defining structure B1 and a compensation structure B2, and each of the compensation structure B2 has a first width W1 along a first direction (x-axis direction) and a second width W2 along a second direction (y-axis direction). The first direction and the second direction is perpendicular to each other.

The first width W1 is positively correlated to the distance from the compensation structure B2 to the curving center axis (i.e., the y-axis in FIG. 16, that is, the fixing center axis described below), that is, the closer the distance from the curving center axis, the smaller the first width W1 of the compensation structure, and the compensation structures having the same distance from the curved center axis in the first direction have the same first width W1. The distance from the curving center axis in the first direction refers to the distance from the center point of each of the compensation structure to the curving center axis along the first direction.

The first width W1 is controlled by the basic value of the black matrix plus the compensation value. As shown in Table 1, the compensation is performed on the cross-color distribution of the test display panel obtained by software in FIG. 10, and then the BM compensation value is calculated. When the center point is at x (mm)=34, that is, the zero point on the x-axis in FIG. 16, the shift amount (shift (mm)) is 0, and no BM compensation is required. On the left and right of the center point, the shift amount is increased as the distance from the central point is increased, the value to be compensated is increased, and the first width W1 is also increased.

TABLE 1

BM compensation value

| X(mm) | Y(mm) | Shift(um) |
|---|---|---|
| 0 | 68.04 | 0.005 |
| 2 | 68.04 | 1.807 |
| 4 | 68.04 | 3.296 |
| 6 | 68.04 | 4.473 |
| 8 | 68.04 | 5.337 |
| 10 | 68.04 | 5.889 |
| 12 | 68.04 | 6.127 |
| 14 | 68.04 | 6.052 |
| 16 | 68.04 | 5.664 |
| 18 | 68.04 | 4.961 |
| 20 | 68.04 | 3.944 |
| 22 | 68.04 | 2.612 |
| 24 | 68.04 | 0.966 |
| 26 | 68.04 | −0.951 |
| 28 | 68.04 | −0.704 |
| 30 | 68.04 | −0.471 |
| 32 | 68.04 | −0.236 |
| 34 | 68.04 | 0.000 |
| 36 | 68.04 | 0.236 |
| 38 | 68.04 | 0.471 |
| 40 | 68.04 | 0.704 |
| 42 | 68.04 | 0.951 |
| 44 | 68.04 | −0.966 |
| 46 | 68.04 | −2.612 |
| 48 | 68.04 | −3.944 |
| 50 | 68.04 | −4.961 |
| 52 | 68.04 | −5.664 |
| 54 | 68.04 | −6.052 |
| 56 | 68.04 | −6.127 |
| 58 | 68.04 | −5.889 |
| 60 | 68.04 | −5.337 |
| 62 | 68.04 | −4.473 |
| 64 | 68.04 | −3.296 |
| 66 | 68.04 | −1.807 |
| 68 | 68.04 | −0.005 |

The extending direction of the curving center axis is parallel to the second direction. The second width W2 of each compensation structure is substantially the same.

A plurality of first grooves are provided in the non-display area B of the first substrate 1A, a plurality of second grooves are provided in the non-display area B of the second substrate 2A, and the second groove is disposed corresponding to the first groove. The black matrix 24 of the second substrate 2A can block light leakage of each pixel after the curved display panel is curved. The fixing spacer 6 is provided between the first substrate 1A and the second substrate 2A, the first end thereof is located in the first groove, and the second end thereof is located in the second groove.

In this exemplary embodiment, the curved display panel further includes a sealant layer 8 that is adhered between the fixing spacer 6 and the first substrate 1A, and between the fixing spacer 6 and the second substrate 2A.

In the present exemplary embodiment, the sealant layer 8 is a rigid sealant layer.

In this exemplary embodiment, the first groove is disposed in a planarization layer 13 of the first substrate 1A, and the first groove includes two first sub-grooves 12 and four second sub-grooves 11; each of the first sub-grooves 12 is arranged in a cross shape, and a connecting line of central points of the two first sub-grooves 12 and a fixing center axis of the first substrate 1A are arranged in a collinear way; the fixing center axis of the first substrate is the center axis of the first substrate 1A when being curved, which is parallel to the display surface. The four second sub-grooves 11 are respectively disposed at four corner parts of the planarization layer 13, and the second sub-groove 11 may include a second horizontal sub-groove parallel to a horizontal side of the planarization layer 13 and a second longitudinal sub-groove parallel to a longitudinal side of the planarization layer 13. One end of the second horizontal sub-groove close to the longitudinal side of the planarization layer 13 is communicated with one end of the second longitudinal sub-groove close to the horizontal side of the planarization layer 13.

In this exemplary embodiment, the second groove is provided in a coating protection layer 23 of the second substrate and extends into the black matrix 24. The second groove may include two third sub-grooves 22 and four fourth sub-grooves 21. Each of the third sub-grooves 22 is arranged in a cross shape, and a connecting line of central points of the two third sub-grooves 22 and a fixing center axis of the second substrate 2A are arranged in a collinear way. The fixing center axis of the second substrate is the center axis of the second substrate 2A when being curved, which is parallel to the display surface. The four fourth sub-grooves are respectively disposed at four corner parts of the coating protection layer 23. The fourth sub-groove 21 may include a fourth horizontal sub-groove parallel to a horizontal side of the coating protection layer 23 and a fourth longitudinal sub-groove parallel to a longitudinal side of the coating protection layer 23. One end of the fourth horizontal sub-groove close to the longitudinal side of the coating protection layer 23 is communicated with one end of the fourth longitudinal sub-groove close to the horizontal side of the coating protection layer 23.

The specific structure of the curved display panel has been described in detail in the manufacturing method thereof, which will not be repeated here.

Further, the present disclosure also provides a display device. The display device may include the curved display panel described above. The specific structure of the curved display panel has been described in detail above, which will not be repeated here.

The features, structures, or characteristics described above may be combined in any suitable manner in one or more embodiments, and the features discussed in the various embodiments are interchangeable, if possible. In the description above, numerous specific details are set forth to provide a thorough understanding of the embodiments of the present disclosure. However, those skilled in the art will appreciate that the technical solution of the present disclosure may be practiced without one or more of the specific details, or other methods, components, materials, and the like may be employed. In other instances, well-known structures, materials, or operations are not shown or described in detail to avoid obscuring various aspects of the present disclosure.

The terms "about" and "approximately" used in the specification generally indicate within 20% of a given value or range, preferably within 10%, and more preferably within 5%. The number given herein is an approximate number, which means that the meanings of "about" or "approximately" can be implied without specific instructions.

Although the relative terms such as "above" and "below" are used in the specification to describe the relative relationship of one component to another component shown, these terms are only for convenience in this specification, for example, according to an exemplary direction shown in the drawings. It will be understood that if the device shown is flipped upside down, the component described "above" will become the component "below". When a structure is "on" another structure, it may mean that a structure is integrally formed on another structure, or that a structure is "directly" disposed on another structure, or that a structure is "indirectly" disposed on another structure through other structures.

In the present specification, the terms "one", "a", "the", "said", and "at least one" is used to indicate that there are one or more elements/components or the like; the terms "include", "contain", and "have" are used to indicate an open type meaning of including and means that there may be additional elements/components/etc. in addition to the listed elements/components/etc.; the terms "first", "second", and "third" etc. are used only as markers, and do not limit the number of objects.

It should be understood that the present disclosure is not limited to the detailed structure and arrangement of the components proposed by the present specification. The present disclosure is capable of having other embodiments, and be carried out and implemented in various manners. The foregoing variations and modifications fall within the scope of the present disclosure. It should be understood that the present disclosure disclosed and defined by the present specification extends to all alternative combinations of two or more of the individual features apparent or recited herein and/or in the drawings. All of these various combinations constitute a number of alternative aspects of the present disclosure. The embodiments described in the present specification are illustrative of the best mode for carrying out the invention and will enable those skilled in the art to utilize the present disclosure.

What is claimed is:

1. A curved display panel, comprising:
   a first substrate;
   a second substrate disposed corresponding to the first substrate; and
   a black matrix located on the second substrate and comprising a pixel-defining structure and compensation structures, each of the compensation structures having a first width along a first direction and a second width along a second direction perpendicular to the first direction;
   wherein the first width is positively correlated to a distance from the compensation structure to a curving center axis of the curved display panel, and an extending direction of the curving center axis is parallel to the second direction, wherein:
   a first groove is disposed in a non-display area of the first substrate;
   a second groove is disposed in a non-display area of the second substrate, the second groove being disposed corresponding to the first groove;
   a fixing spacer is disposed between the first substrate and the second substrate, the fixing spacer having a first end located in the first groove and a second end located in the second groove;
   the first groove is disposed in a planarization layer of the first substrate, and comprises:
   two first sub-grooves, each being arranged in a cross shape, a connecting line of central points of the two first sub-grooves and a fixing center axis of the first substrate being arranged in a collinear way, and the center axis of the first substrate being parallel to the second direction; and
   four second sub-grooves disposed at four corner parts of the planarization layer respectively, each of the four second sub-grooves comprising a second horizontal sub-groove parallel to a horizontal side of the planarization layer and a second longitudinal sub-groove parallel to a longitudinal side of the planarization layer, and one end of the second horizontal sub-groove close to the longitudinal side of the planarization layer being communicated with one end of the second longitudinal sub-groove close to the horizontal side of the planarization layer; and
   the second groove is disposed in a coating protection layer of the second substrate and extends onto the black matrix, and the second groove comprises:
   two third sub-grooves, each being arranged in the cross shape, a connecting line of central points of the two third sub-grooves and a fixing center axis of the second substrate being arranged in the collinear way, and the center axis of the second substrate being parallel to the second direction; and
   four fourth sub-grooves disposed at four corner parts of the coating protection layer respectively, each of the four fourth sub-grooves comprising a fourth horizontal sub-groove parallel to a horizontal side of the coating protection layer and a fourth longitudinal sub-groove parallel to a longitudinal side of the coating protection layer, and one end of the fourth horizontal sub-groove close to the longitudinal side of the coating protection layer being communicated with one end of the fourth longitudinal sub-groove close to the horizontal side of the coating protection layer.

2. The curved display panel according to claim 1, wherein the first widths of the compensation structures have a same distance from the curving center axis along the first direction are the same.

3. The curved display panel according to claim 1, wherein the second width of each of the compensation structures is substantially the same.

4. The curved display panel according to claim 1, further comprising: a sealant layer adhered between the fixing spacer and the first substrate, and between the fixing spacer and the second substrate, the sealant layer being a rigid sealant layer.

5. The curved display panel according to claim 1, wherein the curved display panel is implemented in a display device.

6. The curved display panel according to claim 5, wherein the first widths of the compensation structures have a same distance from the curving center axis along the first direction that are the same.

7. The curved display panel according to claim 5, wherein the second width of each of the compensation structures is substantially the same.

8. The curved display panel according to claim 1, wherein the first substrate is an array substrate and the planarization layer is a layer in a non-display area of the array substrate closest to the second substrate.

9. The curved display panel according to claim 1, wherein:
the second substrate is a color filter substrate;
the coating protection layer is a layer in a non-display area of the color filter substrate closest to the first substrate; and
the black matrix of the second substrate is disposed adjacent to the coating protection layer in the non-display area of the color filter substrate.

10. A method for manufacturing a curved display panel, comprising:
providing the curved display panel, the curved display panel comprising a first substrate and a second substrate, the second substrate comprising a black matrix;
obtaining a target value of the black matrix, wherein obtaining the target value of the black matrix comprises:
fixing a test display panel along a center axis parallel to a display surface of the test display panel, and curving and fixing both sides of the test display panel parallel to the center axis;
obtaining a pixel shift image of the test display panel after the test display panel is curved;
simulating pixel shift information according to the pixel shift image;
obtaining a cross-color distribution of the test display panel according to simulated pixel shift information;
obtaining a black matrix compensation value according to the cross-color distribution; and
obtaining the target value according to the black matrix compensation value;
forming the black matrix according to the target value;
forming a first groove in a non-display area of the first substrate;
forming a second groove in a non-display area of the second substrate, the second groove being disposed corresponding to the first groove; and
forming a fixing spacer having a first end located in the first groove and a second end located in the second groove.

11. The method for manufacturing the curved display panel according to claim 10, further comprising: adhering the fixing spacer to the first substrate and the second substrate by using a sealant.

12. The method for manufacturing the curved display panel according to claim 11, wherein the sealant is a rigid sealant.

13. A method for manufacturing a curved display panel, comprising:
providing a first substrate;
providing a second substrate, the second substrate being disposed corresponding to the first substrate; and
forming a black matrix on the second substrate, the black matrix comprising a pixel-defining structure and compensation structures, each of the compensation structures having a first width along a first direction and a second width along a second direction perpendicular to the first direction;
wherein the first width is positively correlated to a distance from the compensation structure to a curving center axis of the curved display panel, and an extending direction of the curving center axis is parallel to the second direction,
wherein the first width of the compensation structure is obtained by:
fixing a test display panel along a center axis parallel to a display surface of the test display panel, and curving and fixing both sides of the test display panel parallel to the center axis;
obtaining a pixel shift image of the test display panel after the test display panel is curved;
simulating pixel shift information according to the pixel shift image;
obtaining a cross-color distribution of the test display panel according to simulated pixel shift information; and
obtaining a black matrix compensation value according to the cross-color distribution, the black matrix compensation value being the first width of the compensation structure.

* * * * *